Figure 1:
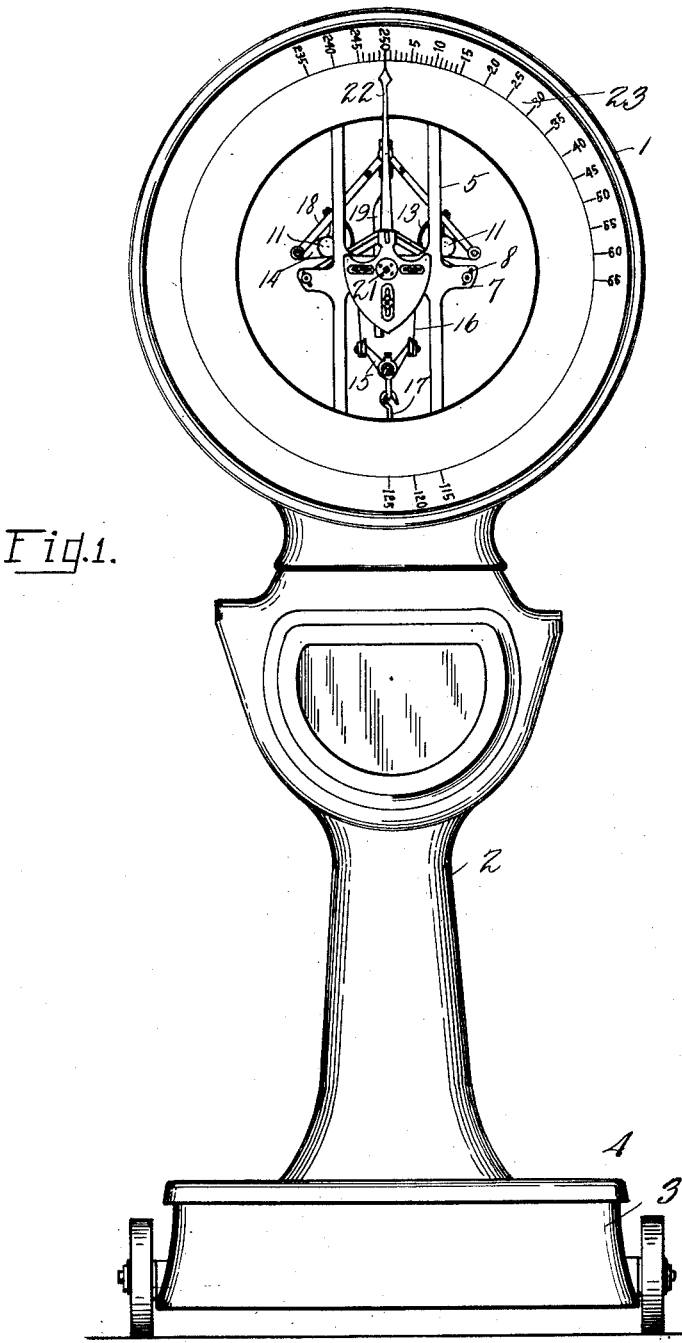

L. C. WETZEL.
WEIGHING SCALE.
APPLICATION FILED DEC. 21, 1916.

1,429,662.

Patented Sept. 19, 1922.
2 SHEETS—SHEET 1.

INVENTOR.
Lewis C. Wetzel
by George R. Frye
Atty.

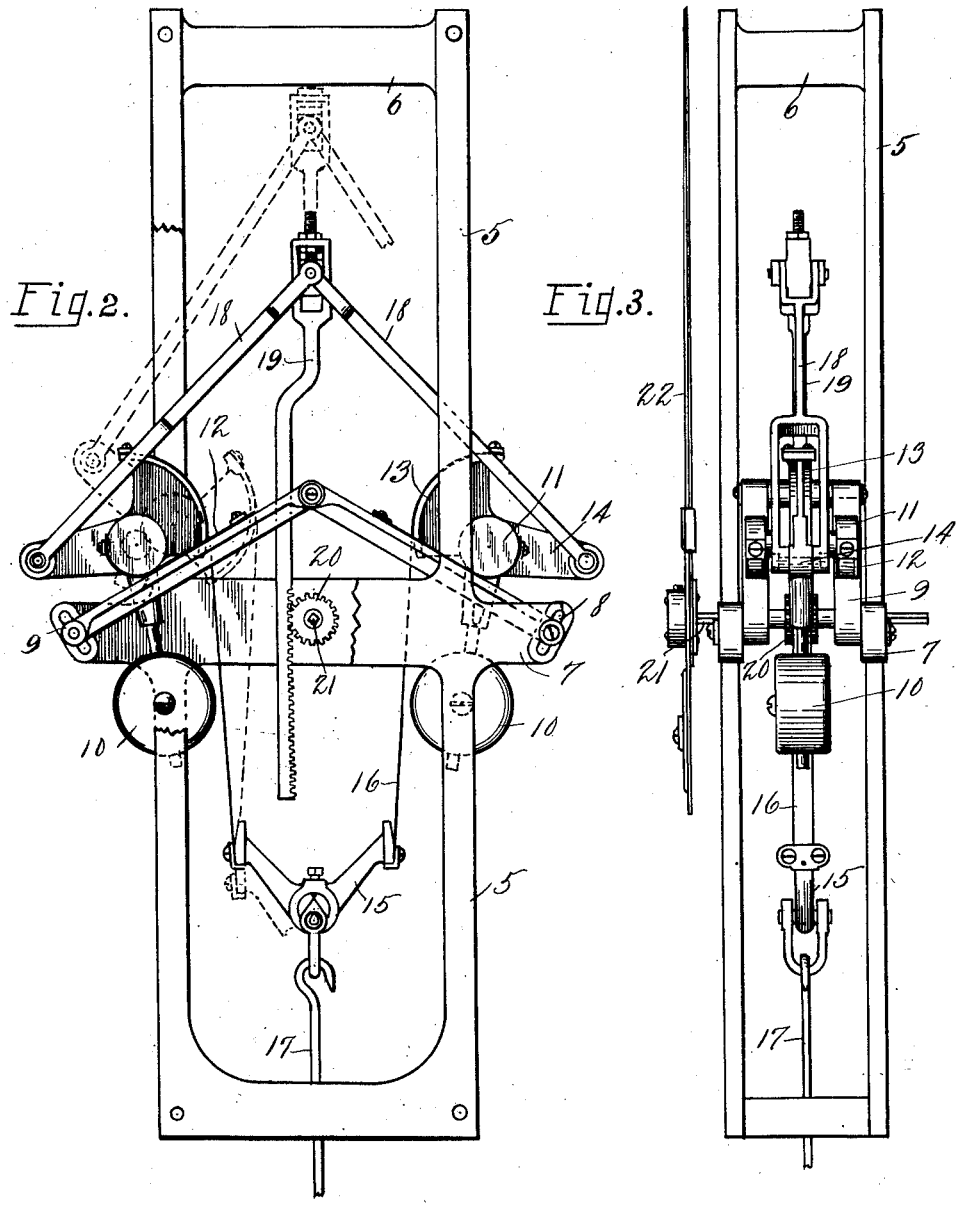

Patented Sept. 19, 1922.

1,429,662

UNITED STATES PATENT OFFICE.

LEWIS C. WETZEL, OF WINDSOR, ONTARIO, CANADA, ASSIGNOR TO TOLEDO SCALE COMPANY, OF TOLEDO, OHIO, A CORPORATION OF NEW JERSEY.

WEIGHING SCALE.

Application filed December 21, 1916. Serial No. 138,257.

*To all whom it may concern:*

Be it known that I, LEWIS C. WETZEL, a citizen of the United States, residing at Windsor, Province of Ontario, Dominion of Canada, have invented certain new and useful Improvements in Weighing Scales, of which the following is a specification.

This invention relates to weighing scales and more particularly to the weighing mechanisms thereof.

My invention is applicable to many different kinds of scales but is particularly adaptable to and shown in connection with pendulum scales designed to weigh comparatively heavy loads.

In scales of this type now on the market the movement of the rack-bar is approximately equal to the movement of the equalizer-bar or main lever, and a relatively small pinion must be used to allow this relatively small movement to rotate the index hand around the chart, and the ratio of the pinion to the index hand is so great that an infinitesimal error at the pinion would be quite noticeable at the indication on the chart.

It is the primary object of this invention to improve scales of this type by providing a weighing mechanism wherein the rack-bar movement is considerably greater than that of scales now in general use, which will provide for a pinion of larger diameter, thereby greatly increasing the accuracy of indication and diminishing the liability of error.

A further object of my invention resides in the provision of a weighing mechanism having a floating pendulum mechanism and a toggle lever arrangement secured thereto to drive the rack-bar.

With the above and other objects in view which will appear as the description progresses, my invention consists of the novel construction, combination and arrangement of parts more fully described in the following specification and particularly pointed out in the appended claims.

Referring to the drawings wherein I have illustrated a preferred embodiment of my invention:—

Fig. 1 is a front elevation of a scale equipped with my invention; Fig. 2 is an enlarged detail front elevation of my improved weighing mechanism; and Fig. 3 is a side elevation thereof.

Referring more particularly to the drawings, 1 designates the housing of the scale encasing the weighing mechanism and supported upon a suitable standard 2 resting upon the base 3 enclosing the platform levers (not shown) supporting the platform 4. Supported within the housing 1 is a frame comprising four pillars 5 connected by cross-bars 6. Ears 7 are formed substantially centrally of each of the pillars 5 and extend outwardly therefrom, each of said ears being provided with an oblique elongated slot 8 adjacent its outer extremity. Adjustably mounted in the slots 8 are the outer ends of inclined track bars 9 pivotally connected at the inner ends to enable adjustments to a variety of degrees of inclination to be readily made. A pair of oppositely-disposed pendulums 10 having lateral roller discs 11 are mounted upon the tracks 9 by means of flexible metallic ribbons 12 secured to the tracks and to said discs 11, being thus interposed between the discs and tracks at every position of the former. Secured to said pendulums 10 intermediate the discs 11 are inwardly extending cam segments 13 formed with an outwardly projecting arm 14 for connection with the indicating mechanism. An equalizer bar 15 is connected at its opposite ends to the upper portions of the segments 13 by means of flexible metallic ribbons 16 and is centrally connected to the platform levers of the scale by means of a steelyard 17. Pivotally connected at their outer extremities to the arms 14 are toggle levers 18 carrying at their junction pivot the rack-bar 19 adapted to mesh with the comparatively large pinion 20 keyed to the indicator shaft 21 journalled in the cross-bars 6. An index hand 22 is also secured to the shaft 21 and is adapted to indicate the weight of the commodity being weighed in connection with the graduated chart 23.

In the operation of my improved weighing mechanism, when the commodity to be weighed is placed upon the platform 4 of the scale the downward pull exerted upon the steelyard 17 is transmitted to the segments 13 through the equalizer bar 15 and ribbons 16, and by pulling the segments downwardly the discs 11 will roll upwardly upon the inclined tracks 9 causing the pendulum weights to swing outwardly to positions offsetting the weight upon the platform 4. As the segments move downwardly the projecting arms 14 swing upwardly, lifting the rack-bar 19 through the toggle levers 18 and operating the indicating mechanism.

While it will be apparent that the illustrated embodiment of my invention herein disclosed is well adapted to adequately fulfill the objects primarily stated, it is to be understood that my invention is susceptible to modification, variation and change without departing from the spirit and scope of the invention as set forth in the subjoined claims.

Having described my invention, I claim:

1. In a weighing scale, weighing mechanism comprising a supporting element, oppositely disposed pendulums carried by said element, means for actuating said pendulums, means whereby said pendulums are moved along said element when actuated, indicating means, and means connected with the pendulums and indicating means for transmitting movement from the pendulums to said indicating means in increased ratio as successive increments are weighed upon the scale.

2. In a weighing scale, a weighing mechanism comprising a track inclined to the horizontal and adjustably mounted within the scale, pendulums carried by and movable on said track, means for actuating said pendulums, indicating means, and means connected with the pendulums for imparting an increased ratio of movement from the pendulums to said indicating means as successive increments are weighed upon the scale.

3. In a weighing scale, a weighing mechanism comprising an adjustable supporting element, a pair of oppositely-disposed pendulums carried by and movable on said element, means for causing said pendulums to move upwardly on said element and swing their pendulous weights outwardly, indicating means, and means whereby the ratio of movement of said pendulums will be increased in transmission to said indicating means as successive increments are weighed upon the scale.

4. In a weighing scale, a weighing mechanism comprising a frame supported within the scale, a track inclined to the horizontal and adjustably mounted upon said frame, oppositely-disposed pendulums carried by and movable on said track, means carried by said pendulums permitting movement on said track, means for operating said pendulums, indicating means, and means whereby the ratio of movement of said pendulums will be increased in transmission to said indicating means as successive increments are weighed upon the scale.

5. In a weighing scale and in combination with the indicating mechanism thereof, a supporting element mounted within said scale, oppositely-disposed pendulums carried by said supporting element, flexible means for actuating said pendulums, and means connecting said pendulums and indicating mechanism whereby movement is transmitted from said pendulums to said indicating mechanism in increased ratio as said pendulums move to counterbalance a load.

6. In a weighing scale, a weighing mechanism comprising a frame supported within the scale, a pair of oppositely-disposed pendulums carried by and movable on said frame, means for causing said pendulums to move upwardly on said frame, indicating mechanism including a rack, and a system of links arranged between the pendulums and the rack for imparting an increased ratio of movement from the pendulums to said indicating means as successive increments are weighed upon the scale.

7. In a weighing scale, a weighing mechanism comprising a frame supported within the scale, a pair of oppositely-disposed pendulums carried by and movable on said frame, means for causing said pendulums to move upwardly on said frame, indicating mechanism including a rack, a system of toggle levers arranged between the pendulums and rack whereby the ratio of movement of said pendulums will be increased in transmission to the rack as successive increments are weighed upon the scale.

LEWIS C. WETZEL.

Witnesses:
C. F. MILLER, Jr.,
F. W. WILSON.